UNITED STATES PATENT OFFICE.

JOHN TWEEDDALE AND FREDERICK B. McCROSKY, OF LOS ANGELES, CALIFORNIA.

MINCED SARDINES.

1,406,590.

Specification of Letters Patent. Patented Feb. 14, 1922.

No Drawing.

Application filed March 19, 1919. Serial No. 283,538.

*To all whom it may concern:*

Be it known that we, JOHN TWEEDDALE and FREDERICK B. McCROSKY, citizens of the United States, residing at Los Angeles, in the county of Los Angeles and State of California, have invented certain new and useful Improvements in Minced Sardines; and we do hereby declare the following to be a full, clear, and exact description of the invention, such as will enable others skilled in the art to which it appertains to make and use the same.

This invention relates to an article of food, and more particularly to a food which is prepared from fish, and a process for preparing the same.

One of the main objects of the invention is to provide a process by means of which sardines may be readily prepared so as to be immediately available for eating purposes, the resulting product being highly nutritious and of appetizing appearance while possessing the pleasing characteristic sardine flavor.

A further object is to provide a food product of the character stated which may be readily spread for preparing sandwiches and similar purposes, and which may also be readily used in cooking for making croquettes, fish cakes, and for similar purposes.

Another object is to provide a process in which the fish are thoroughly cooked under conditions to exclude moisture and are rendered crisp throughout so as to be readily ground or comminuted, the flavor of the fish being retained.

Further objects will appear from the detailed description.

We are aware that potted sardines are now prepared and shipped in quantities to Great Britain, France, and other foreign countries, these sardines being prepared by cooking by means of live steam in suitable steam boxes. The sardines thus prepared, due to the cooking in live steam, do not, however, fully possess the characteristic pleasing flavor of the original sardines, since the cooking operation, performed in the manner specified, destroys a considerable portion of the flavor, and the resulting product, which is of a disagreeable brownish color, does not readily sell in this country. To avoid these objections, we cook the fish under conditions to exclude moisture and to retain the characteristic sardine flavor, and we also use an edible coloring matter for imparting an appetizing and pleasing appearance to the product.

In carrying our invention into effect, the sardines which have been cleaned and scaled, and headed, in the well known manner are first soaked in a relatively strong brine preparation for approximately twenty minutes, being then removed and washed in a relatively weak brine having approximately the strength of ordinary sea water. The fish are then placed in a wire basket and baked in a retort or cooker without access of moisture, or submerged in boiling olive oil or any other suitable oil until cooked and thoroughly crisp throughout. After being thus cooked and crisp, the fish are removed from the oil or cooker and are then passed through a suitable comminuting or grinding machine so as to be reduced to either pasty or flaky form, as desired. The fish thus treated are readily adapted for eating purposes and do not readily spoil. In addition, due to the cooking in oil or baking, it is found that the natural flavor of the fish is retained, the product being an article of food having a pleasing characteristic sardine flavor, and in a form to be readily eaten or used for cooking purposes.

Preferably, though not necessarily, these fish after being thus treated are mixed with a suitable sauce compounded of suitable condiments and spices, together with an oil and a starchy substance to lend body to the resulting product and render the same easy to spread for making sandwiches and similar purposes. This sauce is preferably made of the following ingredients in approximately the proportions stated:

Water 1½ gallons, red beets (small) 2½ to 3½ pounds, garlic (dry) 2 to 4 ounces, tomato purée 3 to 5 quarts, flour or corn starch 2 to 3 pounds, lemons 10 to 15, salt 1 to 4 ounces, peanut oil or corn oil 50 to 100 ounces, red pepper 6 to 10 ounces, parsley 2½ to 6 ounces.

In preparing the sauce, we place one and one-half gallons of cold water in a steam jacket kettle, and place in this water three pounds of sliced red beets, after which the beets are boiled for twenty minutes. We then add the peelings of ten lemons, the juice of which has been removed, three ounces of green parsley, and three ounces of garlic, the resulting mixture being then boiled for one hour and twenty minutes, more water being added during the boiling process so as to have one and one-half gallons at the end of one hour and forty minutes. At the end of this time, the vegetables are removed from the kettle, the sauce being strained and returned to the kettle and brought to a boil, after which are added three and one-half quarts of tomato purée, five ounces of red pepper and fifty ounces of peanut or corn oil, the resulting mixture being boiled for five minutes, after which is added a thin paste made of two and one-half pounds of flour or corn starch mixed with cold water, this paste being stirred into the mixture in the kettle, the resulting mixture being boiled for fifteen to eighteen minutes during which time the stirring is continued. The sauce thus formed is then placed in a suitable mixing machine together with the fish prepared in the manner previously stated, the resulting product being an article of food of pleasing appearance and appetizing flavor which is well adapted for making sandwiches as well as for cooking purposes. This product is placed in suitable cans and sealed, the cans being then thoroughly sterilized and cooled.

The red beets which are employed are for the purpose of imparting a pleasing color to the product, and, if desired, the fish may be prepared in the manner outlined above, the beets being then mixed in with the fish only so as to impart a pleasing appearance thereto, the other ingredients of the sauce being omitted. Also, if desired, the packer may add the following spices in approximately the proportions stated:

Allspice $\frac{1}{2}$ to 1 ounce, paprica 1 to $1\frac{1}{2}$ ounces, cloves 1 to $1\frac{1}{2}$ ounces, bay leaves $\frac{1}{2}$ ounce, mustard (ground) 3 to 6 ounces.

Ordinarily, however, the sauce employed will be formed of the ingredients stated, only, the additional spices being added only when it is desired to produce a highly spiced article.

What we claim is:

1. An article of food consisting of fish cooked sufficiently to have a crisp condition throughout, and ground to form a relatively dry flaky or pasty product in condition for immediate use.

2. A process of making fish food which comprises immersing the fish in oil and boiling the oil until the fish is thoroughly cooked and crisp throughout, and thereafter comminuting the same.

In testimony whereof we affix our signatures in presence of two witnesses.

JOHN TWEEDDALE.
FREDERICK B. McCROSKY.

Witnesses:
H. C. LONDON,
BOYD W. DOYLE.